(12) United States Patent
Kim et al.

(10) Patent No.: US 10,688,896 B2
(45) Date of Patent: Jun. 23, 2020

(54) FLOW RATE PERFORMANCE OPTIMIZING TYPE BIDIRECTIONAL BLOWER

(71) Applicants: Hyundai Motor Company, Seoul (KR); Kia Motors Corporation, Seoul (KR); KBAUTOTECH CO., LTD, Asan-si (KR)

(72) Inventors: Mu-Young Kim, Hwaseong-si (KR); Sang-Ho Kim, Incheon (KR); Chan-Ho Jung, Gumpo-si (KR); Jun-Young Yun, Hwaseong-si (KR); Min-Seok Kim, Hanam-si (KR); Seon-Chae Na, Yongin-si (KR); Young-Bok Sung, Hwaseong-si (KR); Hee-Dong Kong, Cheonan-si (KR)

(73) Assignees: Hyundai Motor Company, Seoul (KR); Kia Motors Corporation, Seoul (KR); KBAUTOTECH CO., LTD, Asan-si (KR)

( * ) Notice: Subject to any disclaimer, the term of this patent is extended or adjusted under 35 U.S.C. 154(b) by 0 days.

(21) Appl. No.: 16/357,038

(22) Filed: Mar. 18, 2019

(65) Prior Publication Data

US 2019/0337428 A1 Nov. 7, 2019

(30) Foreign Application Priority Data

May 2, 2018 (KR) .......................... 10-2018-0050804

(51) Int. Cl.
*F04D 29/42* (2006.01)
*B60N 2/56* (2006.01)

(52) U.S. Cl.
CPC .......... *B60N 2/5628* (2013.01); *B60N 2/565* (2013.01); *B60N 2/5635* (2013.01); *B60N 2/5657* (2013.01)

(58) Field of Classification Search
CPC .... F04D 17/16; F04D 29/4246; F04D 29/441; F04D 29/667; F04D 29/384; F04D 29/386; B60N 2/5635
See application file for complete search history.

(56) References Cited

U.S. PATENT DOCUMENTS

| 2011/0061403 A1* | 3/2011 | Jun ....................... B60N 2/5657 62/3.61 |
| 2016/0369819 A1* | 12/2016 | Lofy ................... F04D 29/4213 |

FOREIGN PATENT DOCUMENTS

| JP | 05-018399 A | 1/1993 |
| JP | 2009287427 A | * 12/2009 |

* cited by examiner

*Primary Examiner* — J. Todd Newton
*Assistant Examiner* — Sabbir Hasan
(74) *Attorney, Agent, or Firm* — Morgan, Lewis & Bockius LLP (57) ABSTRACT

A bidirectional blower may include a blower body having a scroll rib making a length of an entire perimeter scroll guiding air flow in an internal space to an outlet end portion where air discharge is performed, and a fan in which a blade having an inlet angle of an acute angle and an outlet angle of an obtuse angle draws external air into the internal air, thereby realizing the characteristics of lowering an operating noise by preventing a generation of vortex while enhancing air volume performance suitable for a ventilation seat.

14 Claims, 8 Drawing Sheets

FLOW RATE PERFORMANCE OPTIMIZING TYPE BIDIRECTIONAL BLOWER

CROSS-REFERENCE(S) TO RELATED APPLICATIONS

The present application claims priority to Korean Patent Application No. 10-2018-0050804, filed on May 2, 2018, the entire contents of which is incorporated herein for all purposes by this reference.

BACKGROUND OF THE DISCLOSURE

Field of the Disclosure

The present invention relates to a bidirectional blower, and more particularly to a bidirectional blower to which a flow rate performance optimizing structure suitable for a ventilation seat is applied.

Description of Related Art

Due to the demand for a comfortable vehicle interior environment that has been strengthened in recent years, in addition to a heating, ventilation and air conditioning (HVAC) which serves as an integrated air-conditioning system and integrates air-conditioning and ventilation functions to maintain a comfortable vehicle interior environment, the demand for a ventilation seat has been arisen.

In the ventilation seat, in particular, a bidirectional blower having a plurality of blades (wings) and a motor is mounted to a lower end portion of a seat, and air in a lower end portion of the seat, which is drawn by a rotation of the blades generated by a motor control, blows towards a seat cushion and a seat back, and thus comfortable ride comfort caused by a circulation of wind around the seat is provided.

To the present end, the bidirectional blower is configured such that two discharge ports are formed in both directions toward the seat cushion and the seat back and each of the bidirectional discharge ports is formed as a scroll structure for securing a flow rate. Here, the scroll means a zone where a space between the blade inside the blower and an outer case is gradually increased.

Therefore, the ventilation seat keeps ride comfort of a seat occupant more comfortably with wind circulating around the seat cushion and the seat back through a flow rate supply caused by the bidirectional discharge port of the bidirectional blower.

However, since the above-described bidirectional blower is applied to the ventilation seat which should distribute and blow air to both the seat cushion and the seat back, a flow characteristic of the bidirectional blower differs from a flow characteristic of a unidirectional blower applied to a general air-conditioning blower, and the difference in such flow characteristics requires an optimizing structure.

As an example, for design variables for the optimizing structure of the bidirectional blower applied to the ventilation seat, firstly, optimization for an overall structure considering the characteristics of the bidirectional discharge along with optimization for blade inlet angle/outlet angle as well as the number of blades forming the fan are required, secondly, optimization for a structure to which a rib lengthening a scroll length, but causing discharge area loss is applied to is necessary, and thirdly, optimization for a rib shape, that does not form a vortex generation at an outlet end portion when a scroll is increased through an rib application, is required.

The information included in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a flow rate performance optimizing type bidirectional blower which can realizes a performance suitable for a ventilation seat with an optimal flow performance using any one of a scroll rib shape or size and a blade inlet angle/outlet angle as an optimizing design variable and, increases a scroll length and eliminates a vortex generation at an outlet end portion through an optimal combination of a scroll and a rib.

In various aspects of the present invention, a bidirectional blower according to an exemplary embodiment of the present invention may include a blower body in which a length of an entire perimeter scroll guiding air flow in an internal space to continues on an outlet end portion where air discharge is performed through a scroll rib.

As an exemplary embodiment of the present invention, an enlargement of the entire perimeter scroll may be formed of a rib length of the scroll rib. The rib length may form from an end portion of the entire perimeter scroll at an extension angle of an acute angle to form a spacing with one side wall of the outlet end, and the rib length may be formed of an arc of an acute angle with respect to a center of the blower body and may be formed of a triangular shaped triangular rib inclined downward at an end portion of the entire perimeter scroll.

As an exemplary embodiment of the present invention, the scroll rib may form a stream line in air discharge flow flowing to the outlet end, and the stream line may prevent a generation of vortex.

As an exemplary embodiment of the present invention, the blower body may include a fan configured to draw external air into the internal space with a blade having an inlet angle of an acute angle and an outlet angle of an obtuse angle.

As an exemplary embodiment of the present invention, the blower body may include a blower motor mounted therein, the blower motor rotates the fan to draw external air into the internal space, and the blower body divides the outlet end portion into a left discharge port and a right discharge port to make air blowing to the ventilation seat into discharge flows which differ from each other.

As an exemplary embodiment of the present invention, a cushion duct connected to the left discharge port and a back duct connected to the right discharge port may be provided below the ventilation seat, and the cushion duct performs air blowing to a seat cushion of the ventilation seat and the back duct performs air blowing to a seat back of the ventilation seat.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. Since the embodiment may be embodied in various forms by those ordinary skilled in the art to which the present invention pertains, the present invention is not limited to the embodiment set forth herein.

Figure 1:
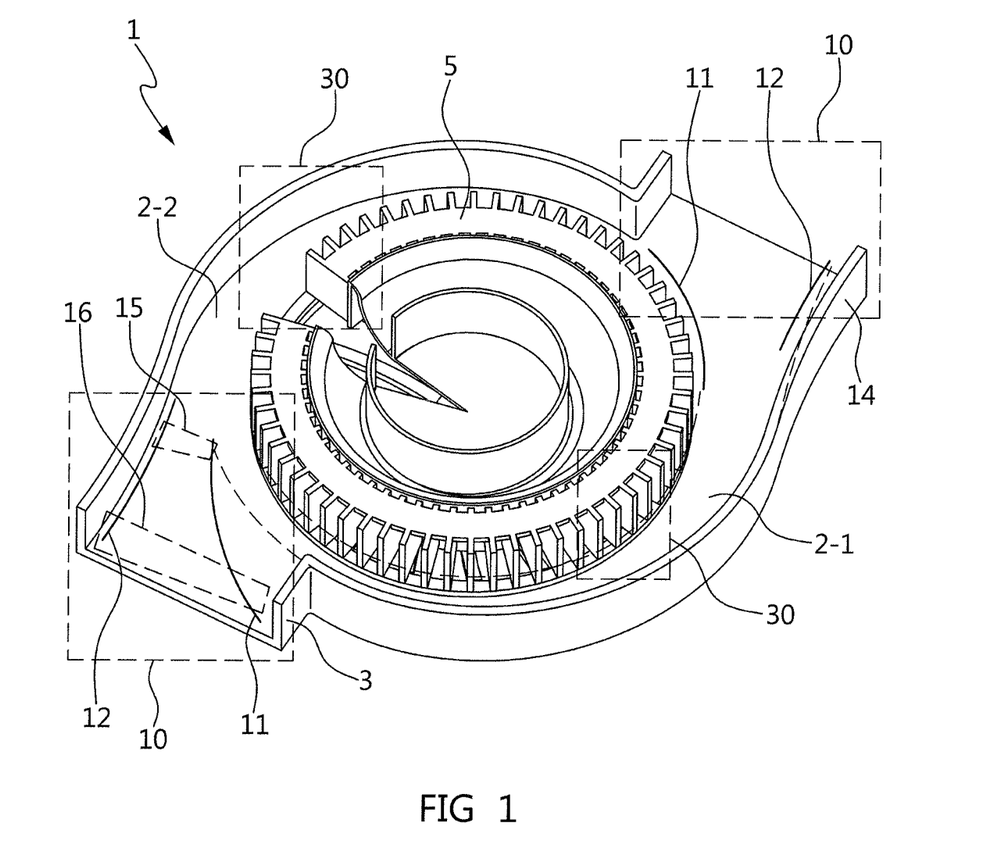
FIG. 1 is a structural view of a bidirectional blower according to an exemplary embodiment of the present invention to which a scroll rib is applied as an optimization design variable for flow rate performance optimization.
Figure 8:
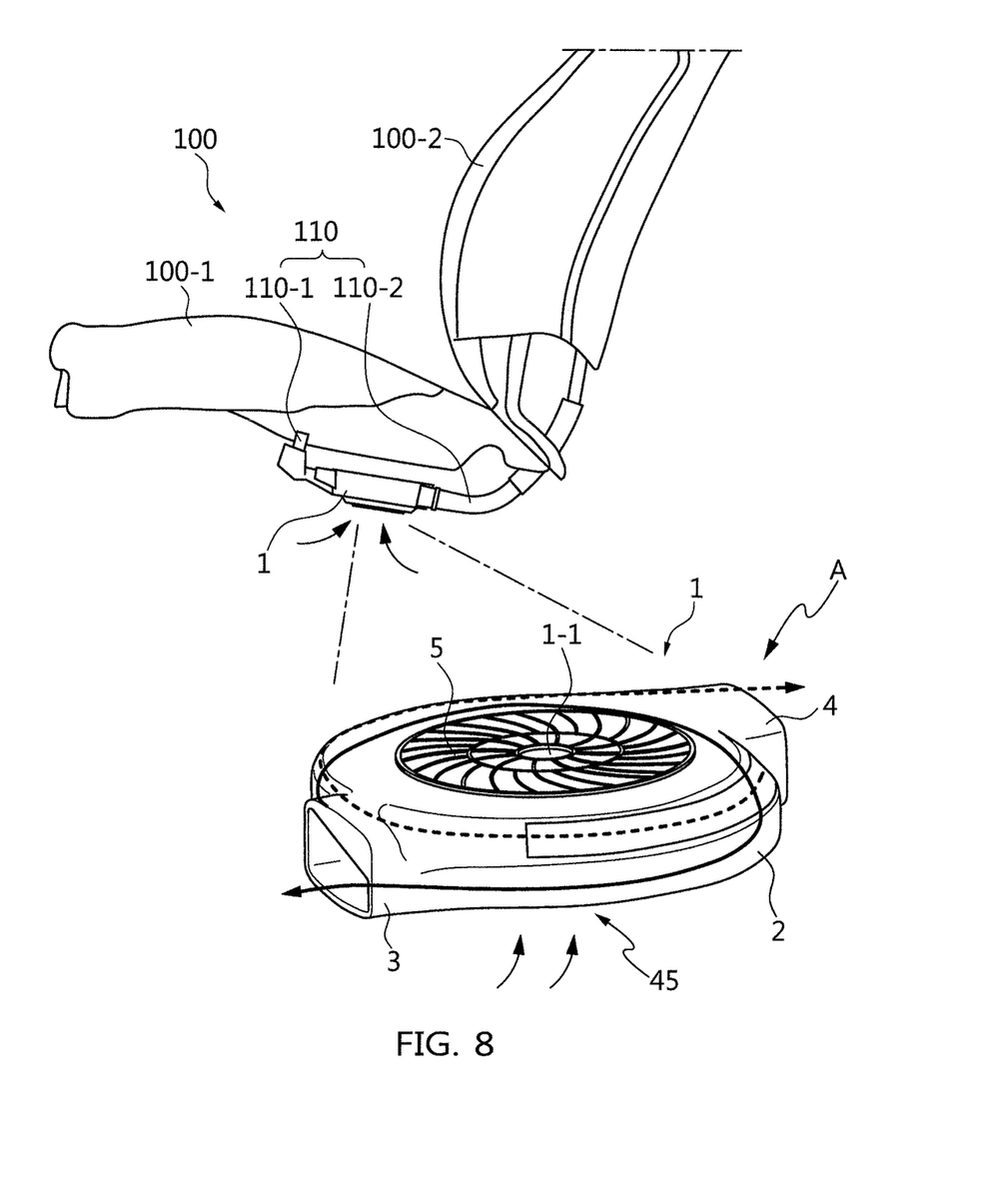
FIG. 8 is a view showing an example of a ventilation seat to which the flow rate performance optimizing type bidirectional blower according to an exemplary embodiment of the present invention is applied.

Referring to FIG. 1, a bidirectional blower 1 includes a blower body 2 in which air blowing is performed in left and right directions, a fan 5 configured to draw external air into an internal space of the blower body 2 by a rotation thereof through an inlet 45, and a plurality of optimizing features 10 and 30 where suction and discharge performances of external air are maximized. In the present case, FIG. 1 illustrates only a lower body of the blower body 2 from which an upper body is removed, but an actual overall shape of the blower body is illustrated in FIG. 8 showing a configuration in which the upper body is coupled to the lower body.

The blower body 2 has an internal space formed therein for receiving the fan 5 which is rotated by a blower motor 1-1 (see FIG. 8), and includes an entire perimeter scroll forming air flow of external air, which is drawn by the fan 5, in opposite directions along a periphery of the fan 5 in the internal space and outlet end portions for discharging external air to the outside in opposite directions. In the present case, the entire perimeter scroll is divided into a left scroll 2-1 and a right scroll 2-2, and the outlet end portions are divided into a left discharge port 3 which is in communication with the outside at a position where the left scroll 2-1 is terminated and a right discharge port 4 which is in communication with the outside at a position where the right scroll 2-2 is terminated.

Each of the left and right scrolls 2-1 and 2-2 applied to the blower body 2 is formed in an entire perimeter scroll shape of the internal space, the entire perimeter scroll shape is a chamfer shape or a stepwise structure of the blower body 2 and sufficiently increases a scroll enlargement length (or a scroll extension length), which is a factor having a great effect on a flow rate/noise performance, to significantly improve an effect of increasing the flow rate and reducing the noise as compared to a conventional cylindrical blower body. Furthermore, each of the left and right discharge ports 3 and 4 applied to the blower body 2 includes a rib optimizing feature 10 of the plurality of optimizing features 10 and 30, thereby maximizing an air discharge performance.

The plurality of optimizing features 10 and 30 are divided into the rib optimizing features 10 having the same shape and applied to the left and right discharge ports 3 and 4, respectively, and blade optimizing features 30 applied to a blade region of the fan 5.

As an example, the rib optimizing features 10 apply imaginary discharge areas for realizing a maximization of the air discharge performance to the left and right discharge ports 3 and 4, respectively, and the imaginary discharge area is divided into a cross-section rib line 11, a cross-section wall body line 12, a discharge inlet cross-section 15 and a discharge outlet cross-section 16. The cross-section rib line 11 is an imaginary line meaning an imaginary wall surface at one wall surface of each of the left and right discharge ports 3 and 4, and the cross-section wall body line 12 is an imaginary line meaning an actual wall surface at the other wall surface of each of the left and right discharge ports 3 and 4. The cross-section rib line 11 is associated with a scroll rib 20 to form a stream line (or a flow trajectory of discharged air), and thus the cross-section rib line is configured to prevent vortex from being generated in a space inside the cross-section rib line 11 and the scroll rib 20 (see FIG. 7). The discharge inlet cross-section 15 is an imaginary cross-section meaning a cross-section for a location where each of the left and right discharge ports 3 and 4 is started, and the discharge outlet cross-section 16 is an imaginary cross-section meaning a cross-section for a location where each of the left and right discharge ports 3 and 4 is terminated. The discharge inlet cross-section 15 is associated with the scroll rib 20 to be formed to be smaller than the discharge outlet cross-section 16 (see FIG. 2). Furthermore, the discharge inlet cross-section 15 has a rectangular cross-sectional shape, while the discharge outlet cross-section 16 may have a sloped trapezoidal cross-sectional shape.

As an example, the blade optimizing feature 30 is applied to a blade 31 of the fan 5 to maximize an air intake performance of the fan 5.

Due to the above, the rib optimizing feature 10 and the blade optimizing feature 30 are applied as optimization design variables that enable an optimal flow rate performance to be obtained without generating vortex in the bidirectional blower 1.

Figure 2:
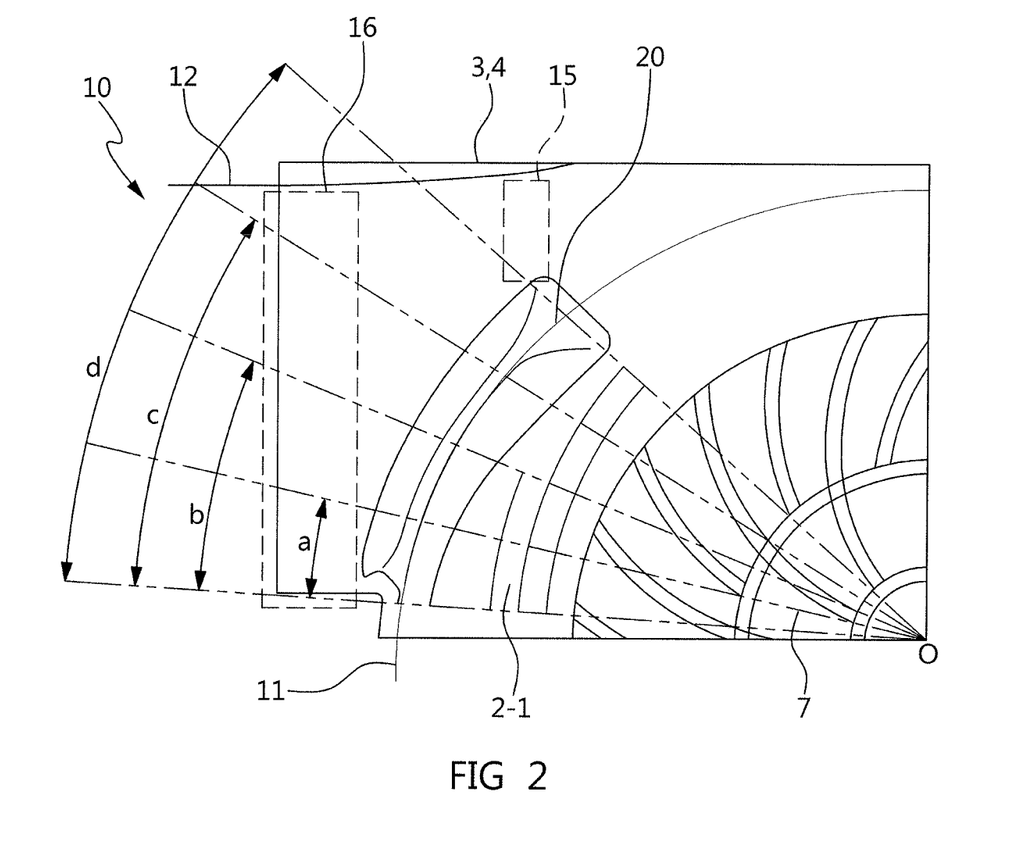
FIG. 2 is a view showing a design example of the scroll rib according to an exemplary embodiment of the present invention.
Figure 3:
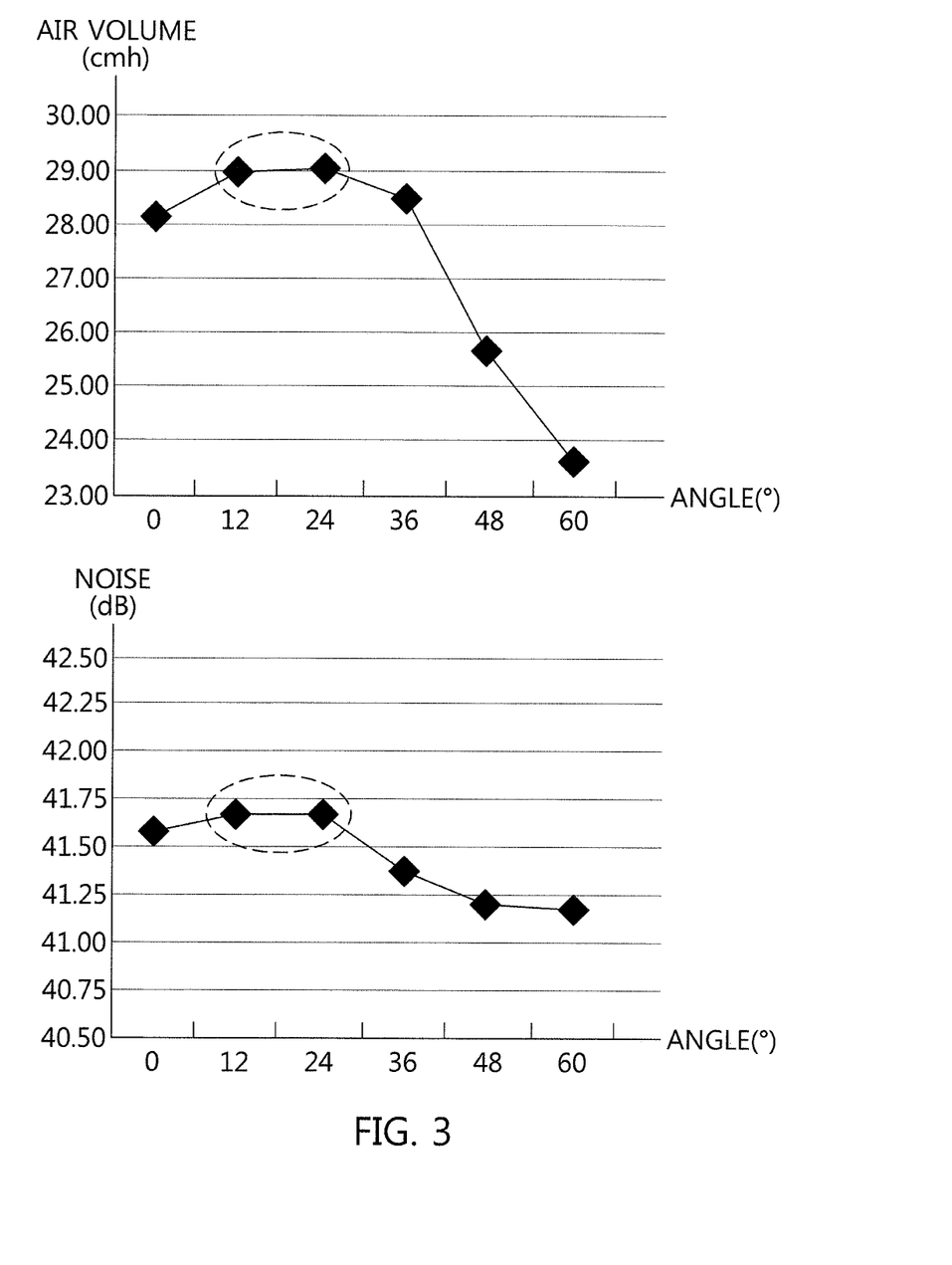
FIG. 3 is an optimization diagram of the scroll rib according to an exemplary embodiment of the present invention.
Figure 4:
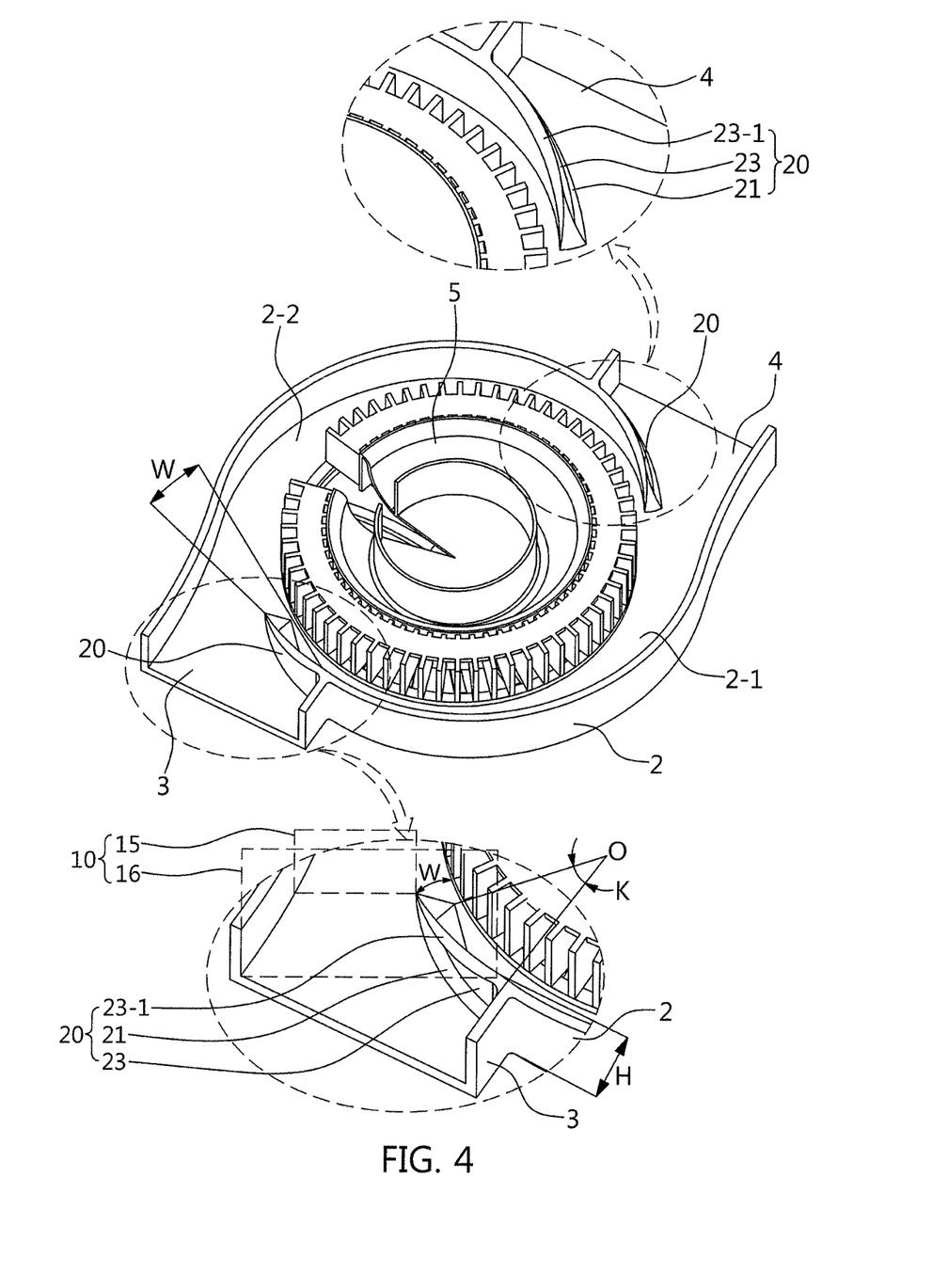
FIG. 4 is a view showing an example in which the scroll rib according to an exemplary embodiment of the present invention is optimally shaped into a triangular rib.

FIG. 2, FIG. 3 and FIG. 4 illustrate a method and detailed configuration for deriving optimization of the rib optimizing feature 10.

Referring to FIG. 2, the rib optimizing feature 10 is embodied as the scroll rib 20.

The scroll rib 20 makes a scroll enlargement length of each of the left and right scrolls 2-1 and 2-2 enlarge from an inside position of the cross-section rib line 11 and an optimization of the scroll rib is designed in consideration of the characteristic that the longer the scroll enlargement length is, the better the flow rate performance is, but the discharge area is disadvantageous.

The scroll ribs 20 are formed at the left discharge port 3 and the right discharge port 4, respectively. The scroll rib at the left discharge port 3 has a design range from an end portion of the left scroll 2-1 to the discharge inlet cross-section 15, and the scroll rib at the right discharge port 4 has a design range from an end portion of the right scroll 2-2 to the discharge inlet cross-section 15. The scroll ribs 20 act to enable the scroll enlargement length to be formed into the stream line of internal air flowing through the left and right scrolls 2-1 and 2-2.

Here, the scroll rib 20 may be designed to have a specific division angle with respect to an imaginary line connecting a center O of the blower body 2 and an end portion of each of the left and right scrolls 2-1 and 2-2. In the present case, the division angle, at which the air discharge performance is maximized and no vortex is generated at each of the left and right discharge ports 3 and 4, may be determined by an experiment for measuring an air volume.

As an example, the division angle may be set to a minimum scroll extension angle a, a maximum scroll extension angle d, and a first scroll extension angle b or a second scroll extension angle c which divide an angle between the minimum and maximum scroll extension angles into two stages. In the present case, the minimum scroll extension angle a is set to 12°, the first scroll extension angle b is set to 24°, the second scroll extension angle c is set to 36°, and the maximum scroll extension angle d is set to 48°.

However, the division angle may be set such that the minimum scroll extension angle a is 12°, the maximum scroll extension angle d is 60° and the first, second and the third scroll extension angles b, c and c-1 divide an angle between the minimum and maximum scroll extension angles into at least three stages. In the present case, the minimum scroll extension angle a is set to 12°, the first scroll extension angle b is set to 24°, the second scroll extension angle c is set to 36°, the third scroll extension angle c-1 is set to 48°, and the maximum scroll extension angle d is applied as 60°.

Referring to FIG. 3, from each of examples of the air volume-angle diagram and the noise-angle diagram, it may be seen that, within the division angle range from 12 to 24° which is the angle range from the minimum scroll extension angle (a) to the first scroll extension angle (b), the effect of increase of the air volume is high, but the noise increase is insignificant despite of the increased air volume.

Therefore, the angle range of the scroll rib 20 may be set to a minimum of 12° to a maximum of 24° such that maximization of the air volume with an excellent noise reduction performance may be promoted. Accordingly, the angle range of 12° to 24° which is the angle range of the minimum scroll extension angle a and the first scroll extension angle b is set as an optimizing scroll rib length angle k.

Referring to FIG. 4, a structure of the scroll rib 20 is started from the cross-section rib line 11 and faces toward the cross-section wall body line 12, and simultaneously forms the discharge inlet cross-section 15 at the cross-section wall body line 12 and forms the discharge outlet cross-section 16 at the cross-section rib line 11.

For example, the structure of the scroll rib 20 includes a base rib 21 comprised of a flat surface which is in close contact with a bottom surface of each of the left and right discharge ports 3 and 4, and a triangular rib 23 having a shape erected vertically on the base rib 21. The triangular rib 23 has the same height as a scroll height H of an end portions of each of the left and right scrolls 2-1 and 2-2, and forms a triangular inclined plane 23-1 which extends toward the internal to each of the left and right discharge ports 3 and 4 at an extension angle w of an acute angle. Therefore, by forming the triangular rib 23 to have a triangular shape with the triangular inclined plane 23-1, as compared with the discharge inlet cross-section 15, the discharge outlet cross-section 16 of each of the left and right discharge ports 3 and 4 may be formed to have an inclined trapezoidal cross-section.

Accordingly, the triangular rib 23 of the scroll rib 20 can simultaneously satisfy a minimization of reduction of an outlet end portion area, which is configured for preventing a generation of vortex, together with an increase of the scroll extension length of each of the left and right scrolls 2-1 and 2-2, which is configured for maximizing the discharge flow rate.

Figure 5:
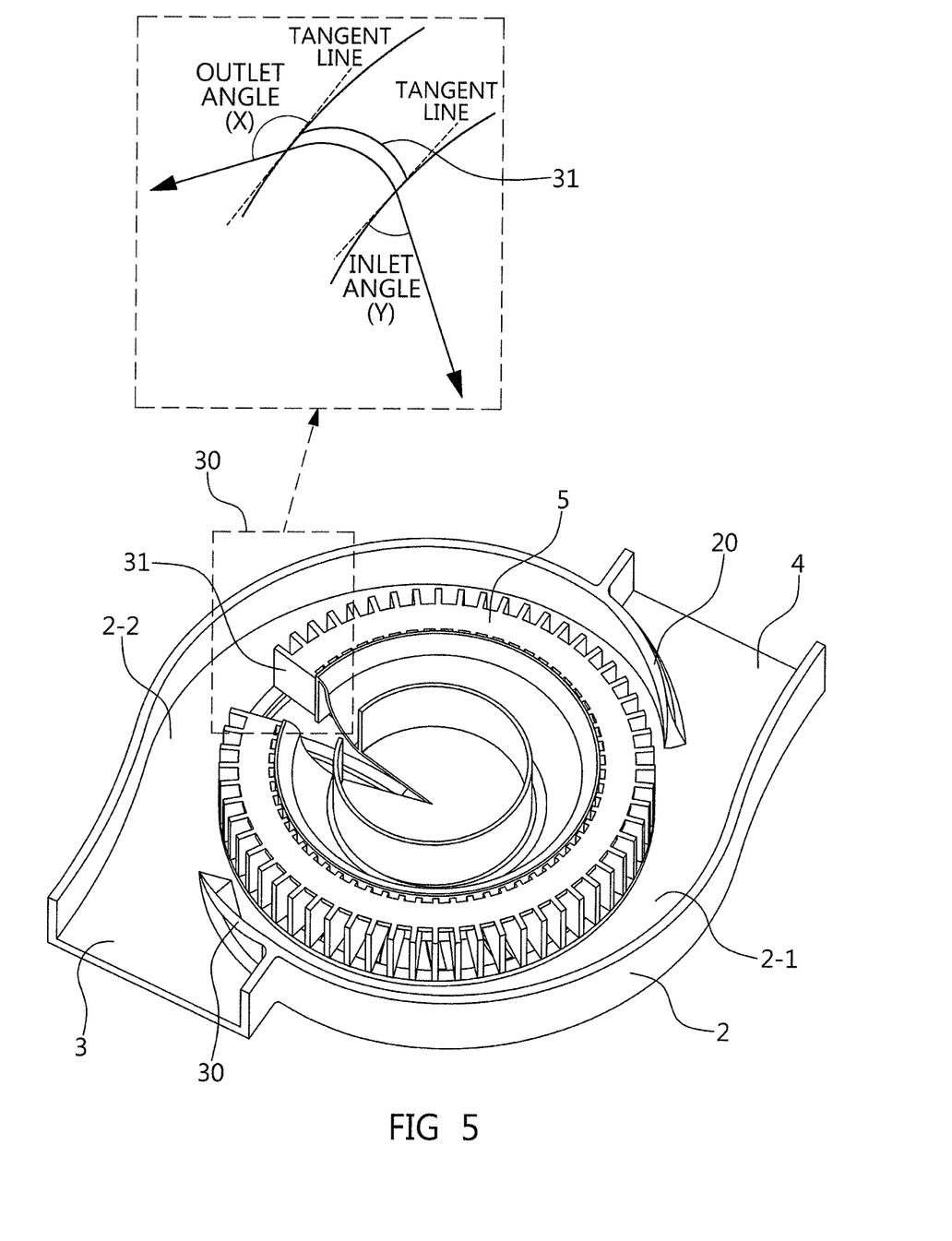
FIG. 5 is a structural view of the bidirectional blower according to an exemplary embodiment of the present invention to which a blade is applied as an optimizing design variable for flow rate performance optimization.
Figure 6:
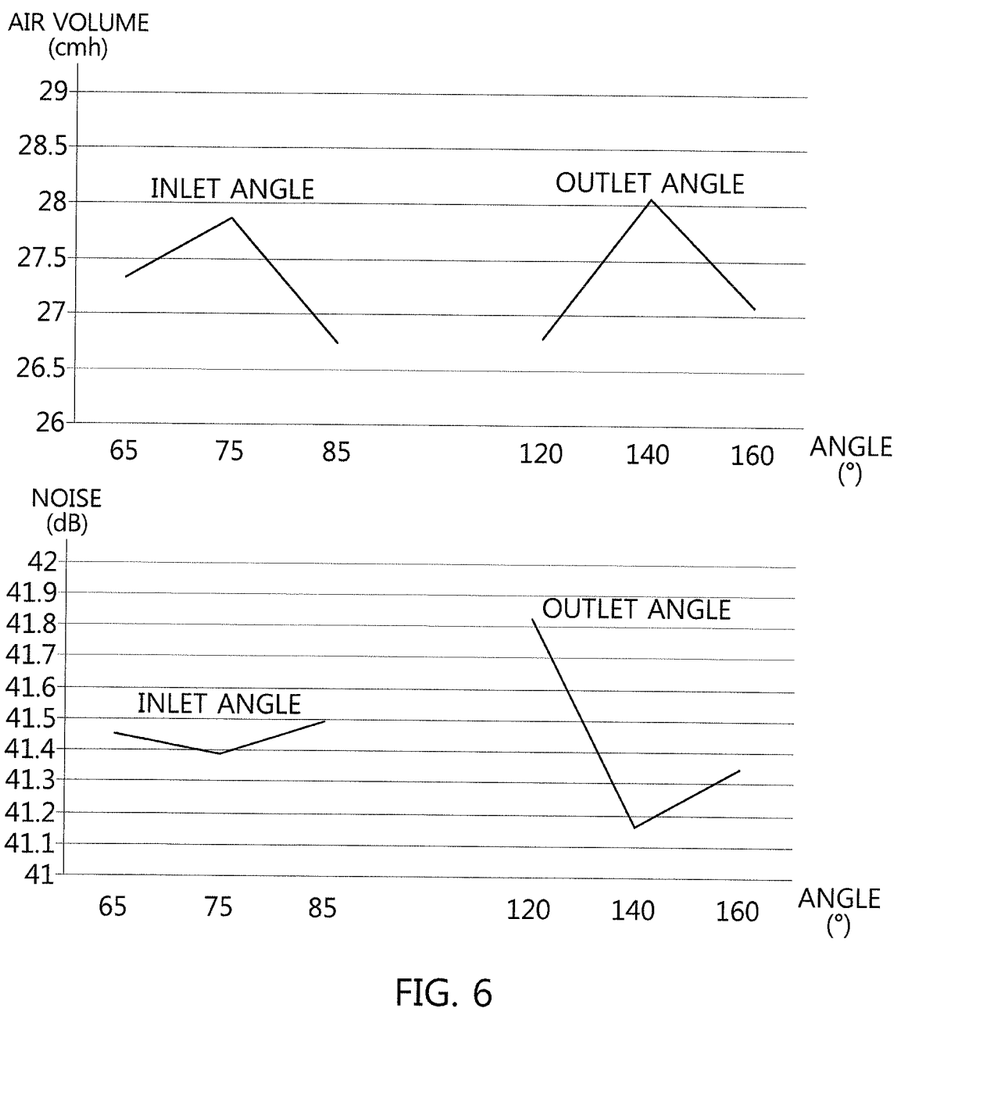
FIG. 6 is an optimization diagram of an inlet angle/an outlet angel of the blade of the present invention.

FIG. 5 and FIG. 6 illustrate a method and detailed configuration for deriving optimization of the blade optimizing feature 30.

Referring to FIG. 5, the blade optimizing feature 30 is applied to each of the blades 31 forming the fan 5, and the blade 31 is designed such that the air intake performance is maximized through the blade inlet angle and the blade outlet angle.

In the design for maximizing the air intake performance, a width of the blade 31 is defined by a starting portion of the blade and a terminating portion of the terminal at which tangent lines are drawn, respectively, and the blade inlet angle is set as an angle formed by the tangent line and the starting portion of the blade and the blade outlet angle is set as an angle formed by the terminating portion of the blade and the tangent line. As such, an air volume experiment is performed for each of the blade inlet angle and the blade outlet angle to determine a specific angle at which maximization of the air intake performance of the fan 5 may be achieved.

As an example, the blade inlet angle is set to any one of 65°, 75° and 85°, and the blade outlet angle is set to any one of 120°, 140° and 160°. Therefore, the blade 31 is applied to the fan 5 in combination with the blade inlet angles of an acute angle and the blade outlet angles of an obtuse angle.

Referring to FIG. 6, it may be seen that, from each of examples in the air volume-angle diagram and the noise-angle diagram, maximization of noise reduction as well as maximization of air volume of the fan 5 are optimized at the blade inlet angle of 75° and the blade outlet angle of 140°.

Figure 7:
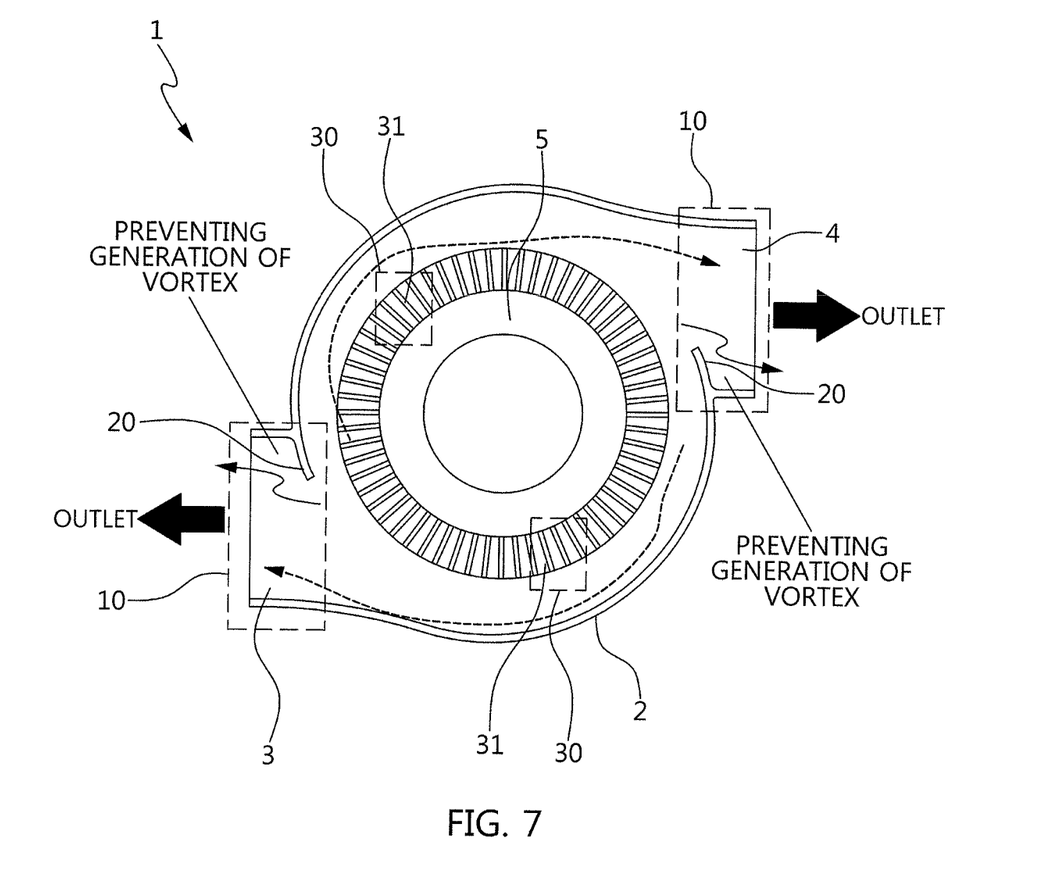
FIG. 7 is a view showing an operation state of the bidirectional blower according to an exemplary embodiment of the present invention to which the triangular rib and the blade inlet angle/outlet angel are applied for flow rate performance optimization.

Meanwhile, FIG. 7 shows an experimental result for an operation of the bidirectional blower 1 to which the fan 5 is applied, wherein the above fan includes the scroll rib 20 consisting of the triangular rib 23 having an optimal scroll rib length of an arc length of 12° to 24° and the blades 31, each of which having the inlet angle of 75°/the outlet angle of 140°.

As illustrated, when rotated by the fan 5, the blades 31 draw maximum air volume of intake air into the internal space of the blower body 2 with minimum noise through the inlet angle of 75°/the outlet angle of 140°. Furthermore, the scroll rib 20 makes the scroll length for each of the right and left scrolls 2-1 and 2-2 more extend through the triangular ribs 23, and the increased scroll extension length maximizes air flow performance of air flowing into opposite directions along each of the right and left scrolls 2-1 and 2-2, respectively. Furthermore, the scroll rib 20 forms a stream line in discharge flow escaping to each of the left and right discharge ports 3 and 4 through the triangular rib 23 to prevent vortex from being generated.

Therefore, the bidirectional blower 1 maximizes the air volume inflow performance while minimizing the noise of the fan 5 with the optimized inlet angle/outlet angle of the blades 31, and discharges maximum air volume to each of the left and right discharge ports 3 and 4 without generating a vortex while maximizing the air flow performance for each of the left and right scrolls 2-1 and 2-2 with the triangular rib 23 of the scroll rib 20.

Meanwhile, FIG. 8 is a view exemplarily illustrating an example of the ventilation seat 100 to which the dual scroll type bidirectional blower 1 is applied.

As illustrated, the ventilation seat 100 includes a seat cushion 100-1 and a seat back 100-2 which is perpendicular to the seat cushion, and is provided with the bidirectional blower 1 connected to a blower duct 110 and positioned below the seat cushion 100-1.

The ventilation seat 100 is a seat for a vehicle, and the blower duct 110 includes a cushion duct 110-1 which is in communication with the seat cushion 100-1, and a back duct 110-2 which is in communication with the seat back 100-2.

The bidirectional blower 1 is the same as the bidirectional blower 1 to which the rib optimizing feature 10 and the blade optimizing feature 30 described with reference to FIGS. 1 to 7 are applied. The above bidirectional blower 1 has only a difference in that the left discharge port 3 of the blower body 2 is connected to the cushion duct 110-1 and the right discharge port 4 is connected to the back duct 110-2.

Therefore, when the bidirectional blower 1 is operated, the blades 31 maximize air volume inflow performance from a lower space of the ventilation seat 100 through a rotation of the fan 5 caused by the blower motor 1-1 in a minimum noise state, and the triangular rib 23 of the scroll rib 20 maximizes the air flow performance for the internal space of the blower body 2 and discharges maximum amount of air volume to the cushion duct 110-1 and the back duct 110-2 without generating a vortex.

As a result, each of the seat cushion 100-1 and the seat back 100-2 of the ventilation seat 100 may be rapidly supplied with the maximum air volume of the bidirectional blower 1 through each of the cushion duct 110-1 and the back duct 110-2.

As described above, the bidirectional blower 1 according to the exemplary embodiment includes the scroll rib 20 making a length of the entire perimeter scroll guiding the air flow in the internal space, continue on the outlet end portion where the air discharge is performed, and the blower body 2 provided with the fan 5 in which the blades 31 having the inlet angle of an acute angle and the outlet angel of an obtuse angle draw external air into the internal space, thereby improving raising the air volume performance suitable for the ventilation seat 100 and preventing a generation of vortex to lower an operating noise.

The above-described bidirectional blower of the present invention optimizes the flow rate performance using the optimization design variables to realize the following operations and effects.

Firstly, by employing the triangular rib shape to optimize the situation where an effect of the flow rate performance improvement due to an increase of the scroll enlargement length and an effect of degradation of the flow rate performance due to the reduction of the outlet end area coexist, a limitation of the existing rib structure is overcome. Secondly, due to the triangular rib shape having a specific angle at which the performance is most optimized, it is possible to extend the scroll without generating a vortex at the outlet end. Thirdly, since the optimizing triangular rib shape may be realized as a mold, there is almost no cost increase for improving the performance. Fourthly, by optimizing the blade inlet angle/outlet angle to the optimizing triangular rib shape, it is possible to realize flow characteristics which is most suitable for the characteristics of the blower which is employed for the ventilation seat and discharges air in both directions. Fifthly, since a setting of the optimizing blade inlet angle/outlet angle may be implemented by a mold, there is little increase in cost for improving the performance.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A bidirectional blower comprising;
a blower body having an internal space inside the blower body; and
an entire perimeter scroll having a scroll rib formed in the blower body and guiding air flow in the internal space,
wherein a length of the entire perimeter scroll continues on an outlet end portion of the blower body where air is discharged through the scroll rib,
wherein an enlargement length of the entire perimeter scroll is formed of a rib length of the scroll rib,
wherein the rib length forms an extension angle which is widened from an end portion of the entire perimeter scroll,
wherin the rib length makes the extension angle an acute angle, and
wherein the acute angle is 12° to 24°.

2. The bidirectional blower of claim 1, further including:
an inlet formed to the blower body;

a first discharge port and a second discharge port formed inside the blower body;

a fan rotatably mounted in the blower body and surrounded by the entire perimeter scroll, wherein the fan includes a blade having an inlet angle and an outlet angle which differ from each other;

wherein the scroll rib includes a first scroll rib disposed in the first discharge port, an end portion of the first scroll rib being formed of a triangular shape inclined downwardly from the first scroll rib, and wherein the scroll rib further includes a second scroll rib disposed in the second discharge port, an end portion of the second scroll rib being formed of a triangular shape inclined downwardly from the second scroll rib.

3. The bidirectional blower of claim 1, wherein the rib length is formed from an end portion of the entire perimeter scroll to form a spacing interval with a side wall of the outlet end portion.

4. The bidirectional blower of claim 3, wherein the rib length is formed of an arc length having an acute angle with respect to a center of the blower body.

5. The bidirectional blower of claim 1, wherein the rib length is formed of a triangular rib, and wherein the triangular rib is formed in a triangular shape inclined downwardly from an end portion of the entire perimeter scroll.

6. The bidirectional blower of claim 1, wherein the scroll rib forms a stream line in air discharge flow flowing to the outlet end portion, and the stream line prevents a generation of vortex.

7. The bidirectional blower of claim 1, wherein the blower body includes a fan configured to draw external air into the internal space, and the fan includes a blade having an inlet angle and an outlet angle which differ from each other.

8. The bidirectional blower of claim 7, wherein the inlet angle of the blade is an acute angle and the outlet angle is an obtuse angle.

9. The bidirectional blower of claim 8, wherein the acute angle is 75° and the obtuse angle is 140°.

10. The bidirectional blower of claim 7, further including a blower actuator mounted therein, wherein the blower actuator rotates the fan to draw the external air into the internal space.

11. The bidirectional blower of claim 10, wherein the blower body divides the outlet end portion into a first discharge port and a second discharge port, and wherein the first discharge port and the second discharge port make air blowing for a ventilation seat into discharge flows which differ from each other.

12. The bidirectional blower of claim 11, wherein the ventilation seat includes a cushion duct and a back duct, and wherein the cushion duct is connected to the first discharge port and the back duct is connected to the second discharge port.

13. The bidirectional blower of claim 12, wherein the cushion duct and the back duct are disposed below the ventilation seat.

14. The bidirectional blower of claim 11, wherein the cushion duct connected to a seat cushion is configured to perform air blowing to the seat cushion of the ventilation seat, and wherein the back duct connected to a seat back is configured to perform air blowing to the seat back of the ventilation seat.

* * * * *